US008655138B2

(12) United States Patent
Lipson et al.

(10) Patent No.: US 8,655,138 B2
(45) Date of Patent: Feb. 18, 2014

(54) WAVEGUIDE STRUCTURE AND RELATED FABRICATION METHOD

(75) Inventors: Michal Lipson, Ithaca, NY (US); Alexander Gondarenko, Springfield, VA (US); Nicholas Sherwood, Ithaca, NY (US)

(73) Assignee: Cornell University, Ithaca, NY (US)

( * ) Notice: Subject to any disclaimer, the term of this patent is extended or adjusted under 35 U.S.C. 154(b) by 259 days.

(21) Appl. No.: 13/104,440

(22) Filed: May 10, 2011

(65) Prior Publication Data

US 2011/0280539 A1  Nov. 17, 2011

Related U.S. Application Data

(60) Provisional application No. 61/332,893, filed on May 10, 2010.

(51) Int. Cl.
*G02B 6/10* (2006.01)
*G02B 6/26* (2006.01)
*G02B 6/42* (2006.01)

(52) U.S. Cl.
USPC ............................................. 385/146; 385/43

(58) Field of Classification Search
USPC .............................. 385/43, 129, 131, 132, 146
See application file for complete search history.

(56) References Cited

U.S. PATENT DOCUMENTS

| | | | |
|---|---|---|---|
| 6,580,863 B2 | 6/2003 | Yegnanarayanan et al. | |
| 6,818,921 B2 | 11/2004 | Yasukawa | |
| 6,917,727 B2 | 7/2005 | Gunn, III et al. | |
| 6,946,238 B2 | 9/2005 | Zhang et al. | |
| 6,968,110 B2 | 11/2005 | Patel et al. | |
| 7,016,587 B2 | 3/2006 | Kubby et al. | |
| 7,020,364 B2 | 3/2006 | Ghiron et al. | |
| 7,118,682 B2 | 10/2006 | Patel et al. | |
| 7,162,112 B2 | 1/2007 | Lin et al. | |

(Continued)

OTHER PUBLICATIONS

R. Briggs et al, Wafer-bonded single-crystal silicon slot waveguides and ring resonators, App. Physics Letters 94, 021106 (2009).

(Continued)

*Primary Examiner* — Rhonda Peace
(74) *Attorney, Agent, or Firm* — William Greener; Alek P. Szecsy; Bond, Schoeneck & King, PLLC (57) ABSTRACT

A method for fabricating a waveguide structure (i.e., preferably an optical waveguide structure) uses a two mask process step sequence for forming a waveguide layer over a substrate. A first mask within the two mask step process sequence is used to etch the substrate to provide a pillar within the substrate. A second mask within the two mask process step sequence is self aligned to, and covers a top and at least a portion of the sidewalls of, the pillar. The second mask is used as a thermal oxidation mask that provides an optical waveguide layer from a top portion of the pillar that is separated from a thinned substrate derived from the substrate by a waveguide isolation layer formed from thermal oxidation of at least a bottom portion of the pillar. Under conditions of manufacturing economy, and as a result of the processing sequence, the waveguide layer is formed with a non-planar bottom surface including a valley in the bottom surface of the waveguide layer and the substrate is formed with a non-planar top surface including a peak in the top surface of the substrate that corresponds with the valley in the bottom surface of the waveguide layer.

23 Claims, 3 Drawing Sheets

(56) References Cited

U.S. PATENT DOCUMENTS

| | | | |
|---|---|---|---|
| 7,174,072 B2* | 2/2007 | Oohara et al. | 385/43 |
| 7,248,773 B2 | 7/2007 | Chang et al. | |
| 7,262,464 B2 | 8/2007 | Takafuji et al. | |
| 7,376,308 B2 | 5/2008 | Cheben et al. | |
| 7,551,829 B2* | 6/2009 | Enami et al. | 385/141 |
| 7,598,104 B2 | 10/2009 | Teng et al. | |
| 7,696,058 B2 | 4/2010 | Kakehata | |
| 7,754,578 B2 | 7/2010 | Villa et al. | |
| 7,831,123 B2 | 11/2010 | Sparacin et al. | |
| 7,883,990 B2 | 2/2011 | Levy et al. | |
| 7,907,811 B2* | 3/2011 | Fattal et al. | 385/146 |
| 7,995,892 B2* | 8/2011 | Bond et al. | 385/131 |
| 2003/0059195 A1* | 3/2003 | Brennan et al. | 385/146 |
| 2005/0265662 A1* | 12/2005 | Oohara et al. | 385/43 |
| 2008/0031579 A1* | 2/2008 | Enami et al. | 385/102 |
| 2009/0279838 A1* | 11/2009 | Fattal et al. | 385/146 |
| 2009/0324164 A1 | 12/2009 | Reshotko | |
| 2010/0260462 A1 | 10/2010 | Zhang et al. | |
| 2011/0280539 A1* | 11/2011 | Lipson et al. | 385/146 |

OTHER PUBLICATIONS

L. Chen et al, High performance germanium photodetectors integrated on submicron silicon waveguides by low temperature wafer bonding, (2008).

JM. Fedeli et al, "Integration Issues of a Photonic Layer on Top of a CMOS Circuit," Proc. of SPIE vol. 6125, 61250H1-61250H15 (2006).

* cited by examiner

WAVEGUIDE STRUCTURE AND RELATED FABRICATION METHOD

CROSS-REFERENCE TO RELATED APPLICATION

This application is related to, and derives priority from, U.S. Provisional Patent Application Ser. No. 61/332,893, filed 10 May 2010, and titled "Waveguide and Fabrication Method," the content of which is incorporated herein fully by reference.

STATEMENT OF GOVERNMENT INTEREST

This invention was made with government funding under National Science Foundation grant EEC-0646547. The United States Government has certain rights in this invention.

BACKGROUND OF THE INVENTION

Conventional electron physics based semiconductor device technology has been reaching physical limitations in terms of semiconductor structure layer thicknesses and semiconductor structure separation distances that are used in fabricating conventional semiconductor devices. Thus, a need has recently evolved for alternative technical approaches that may be used to augment or replace conventional semiconductor device technology to assure that continued advances in information technology may be realized in the absence of advances in conventional semiconductor device technology.

One particular alternative technology approach that may be used to augment or replace conventional semiconductor device technology uses optoelectronic devices rather than conventional semiconductor devices. Optoelectronic devices fundamentally provide for potentially higher signal processing speeds and signal propagation speeds in comparison with conventional semiconductor devices. In addition, optoelectronic devices and optoelectronic structures that are used within optoelectronic circuits often provide for multiple simultaneous parallel signal processing characteristics and multiple simultaneous parallel signal transmission characteristics.

In conjunction with optoelectronic devices as replacements for conventional electron physics based semiconductor devices, there also exists a need for optical waveguide structures to replace metallic interconnect structures that are typically used to interconnect conventional semiconductor devices. Desirably, such optical waveguide structures will include adequate isolation to secure optimal performance and minimized cross-talk with respect to adjacent optical waveguide structures or other further separated optical waveguide structures.

Thus, desirable are optical waveguide structures and methods for efficiently fabricating those optical waveguide structures, to provide for enhanced operation of optoelectronic devices within advanced optoelectronic circuits.

SUMMARY

The embodiments are directed towards a waveguide structure and a method for fabricating the waveguide structure. Typically, but not necessarily exclusively, the waveguide structure comprises an optical waveguide structure. An optical waveguide structure in accordance with the embodiments is intended for transmission of optical signals in wavelength regions including but not limited to the infrared, the visible and the ultraviolet wavelength regions ranging from about 100 nanometers to about 20 microns.

In particular, the method for fabricating the waveguide structure in accordance with the embodiments includes masking a thermally oxidizable waveguide material substrate (i.e., a bulk substrate) with a first mask to provide a first masked thermally oxidizable waveguide material substrate and etching the first masked thermally oxidizable waveguide material substrate to provide an etched first masked thermally oxidizable waveguide material substrate having a pillar beneath the first mask. The method for fabricating the waveguide structure in accordance with the embodiments also provides for masking the sidewalls and the top of the pillar within the etched first masked thermally oxidizable waveguide material substrate with a second mask to provide a second masked thermally oxidizable waveguide material substrate and thermally oxidizing the second masked thermally oxidizable waveguide material substrate in a fashion that oxidizes a lower portion of the pillar but not an upper portion of the pillar, to provide: (1) a waveguide layer from the unoxidized upper portion of the pillar; separated from (2) a thinned substrate derived from the second masked thermally oxidizable waveguide material substrate; by (3) a waveguide isolation layer formed at least in part from an oxidized lower portion of the pillar.

As a result of the particular foregoing method in accordance of the embodiments, the embodiments provide a waveguide structure that may include: (1) a waveguide layer having a valley in a bottom (or lower) surface of the waveguide layer (i.e., generally a waveguide layer having a non-planar bottom surface or interface); that corresponds with (2) a peak in a top (or upper) surface of the thinned substrate (i.e., generally a thinned substrate having a non-planar top surface or interface) over which is located the waveguide layer that contains the valley within the bottom surface of the waveguide layer. Thus, in accordance with the foregoing description, a non-planar bottom surface of a waveguide layer or a non-planar top surface of a thinned substrate is also intended to include a non-planar bottom interface of the waveguide layer or a non-planar top interface of the thinned substrate with a layer, such as but not limited to a waveguide isolation layer, interposed between the waveguide layer and the thinned substrate, either or both of which may have the non-planar surface or interface.

A particular waveguide structure in accordance with the embodiments includes a waveguide layer located over a substrate. The waveguide layer comprises a waveguide material and includes a non-planar bottom surface of the waveguide layer.

A particular optical waveguide structure in accordance with the embodiments includes a substrate. The particular optical waveguide structure also includes an optical waveguide isolation layer located over the substrate. The particular optical waveguide structure also includes an optical waveguide layer comprising an optical waveguide material located over the optical waveguide isolation layer. The optical waveguide layer has a valley within a bottom surface of the optical waveguide layer that corresponds with a peak within a top surface of the substrate A particular method for fabricating a waveguide structure in accordance with the embodiments includes forming a first mask layer upon a substrate that comprises a thermally oxidizable waveguide material to provide a first masked substrate. The particular method also includes etching the first masked substrate to provide a pillar beneath the first mask layer within an etched first masked substrate. The particular method also includes forming a second mask layer upon the sidewalls and top of the pillar within the etched first masked substrate to provide a second masked substrate. The particular method also includes thermally oxidizing the second masked substrate to provide a waveguide layer from a top portion of the pillar beneath the second mask layer separated from a thinned substrate derived from the second masked substrate by a waveguide isolation layer derived from thermal oxidation of the thermally oxidizable waveguide material interposed between the waveguide layer and the thinned substrate.

A particular method for fabricating an optical waveguide structure in accordance with the embodiments includes forming a first mask layer over a bulk monocrystalline silicon substrate to provide a first masked bulk monocrystalline silicon substrate. The particular method also includes etching the first masked bulk monocrystalline silicon substrate to provide a pillar beneath the first mask layer within an etched first masked bulk monocrystalline silicon substrate. The particular method also includes forming a second mask layer upon the sidewalls and top of the pillar within the etched first masked bulk monocrystalline silicon substrate to provide a second masked bulk monocrystalline silicon substrate. The particular method also includes thermally oxidizing the second masked bulk monocrystalline silicon substrate to provide a monocrystalline silicon waveguide layer from a top portion of the pillar beneath the second mask layer separated from a thinned substrate derived from the second masked bulk monocrystalline silicon substrate by a waveguide isolation layer derived from thermal oxidation of the monocrystalline silicon waveguide material interposed between the monocrystalline silicon waveguide layer and the thinned substrate.

BRIEF DESCRIPTION OF THE DRAWINGS

The objects, features and advantages of the embodiments are understood within the context of the Detailed Description of the Embodiments, as set forth below. The Detailed Description of the Embodiments is understood within the context of the accompanying drawings, that form a material part of this disclosure, wherein.

DETAILED DESCRIPTION OF THE EMBODIMENTS

The embodiments provide a waveguide structure and a method for fabricating the waveguide structure. The method for fabricating the waveguide structure comprises a multistep masking and etching method. The multistep masking and etching method includes a first masking step that uses a first mask layer located over a thermally oxidizable waveguide material substrate to provide via a first etching a pillar beneath the first mask layer within an etched first masked thermally oxidizable waveguide material substrate. The multistep masking method then uses a second mask layer upon the top and at least a portion of the sidewalls of the pillar to form a second masked thermally oxidizable waveguide material substrate, prior to thermally oxidizing the second masked thermally oxidizable waveguide material substrate to consume a bottom portion of the pillar but not a top portion of the pillar. The unconsumed top portion of the pillar comprises a waveguide layer within a waveguide structure that is separated from a thinned thermally oxidizable waveguide material substrate by a waveguide isolation layer that is formed at least in-part from the consumed bottom portion of the pillar.

As a result of the foregoing particular method in accordance with the embodiments, within the resulting waveguide structure the waveguide layer has a non-planar bottom surface (i.e., at an interface with a top surface of the waveguide isolation layer) that typically includes a valley within a bottom surface of the waveguide layer that corresponds with a peak within a non-planar top surface of the thinned thermally oxidizable waveguide material substrate (i.e., at an interface with a bottom surface of the waveguide isolation layer) that also comprises the waveguide structure.

While the embodiments are described within the context of a bulk monocrystalline silicon semiconductor substrate as a thermally oxidizable optical waveguide material substrate for fabricating a monocrystalline silicon optical waveguide layer within an optical waveguide structure in accordance with the embodiments, such is only intended as a non-limiting illustrative embodiment. In a more general sense, the embodiments also contemplate, and include, a waveguide structure including but not limited to an optical waveguide structure and a method for fabricating the waveguide structure including but not limited to the optical waveguide structure that use (as cited above) a thermally oxidizable waveguide material substrate, whether or not the thermally oxidizable optical waveguide material substrate is intended for an optical waveguide structure, is crystalline (or monocrystalline) or comprises a silicon material.

FIG. 1(a) to FIG. 1(j) show a series of schematic cross-sectional diagrams illustrating the results of progressive stages in fabricating an optical waveguide structure in accordance with the embodiments.

Figure 1A:
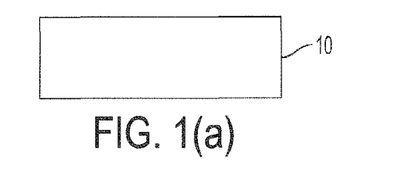
FIG. 1(a) to FIG. 1(j) shows a series of schematic cross-sectional diagrams illustrating the results of progressive process steps in fabricating an optical waveguide structure in accordance with the embodiments.

FIG. 1(a) first shows a substrate 10 that is intended as comprising a bulk monocrystalline silicon semiconductor material (i.e., the substrate 10 comprises a bulk monocrystalline silicon semiconductor substrate). The substrate 10 as illustrated in FIG. 1(a) may comprise an intrinsic monocrystalline silicon semiconductor material (i.e., a monocrystalline silicon semiconductor material that is not doped). Alternatively, the substrate 10 as illustrated in FIG. 1(a) may comprise a doped monocrystalline silicon material using any type and concentration of dopant. The substrate 10 as a bulk monocrystalline silicon semiconductor substrate is otherwise generally conventional within the microelectronics fabrication art and the optoelectronics fabrication art.

Figure 1B:
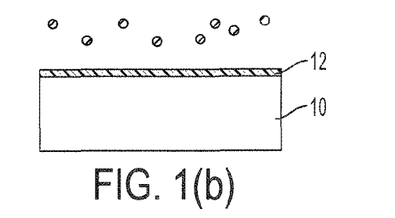
Figure 1C:
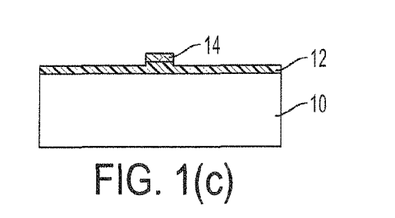
Figure 1D:
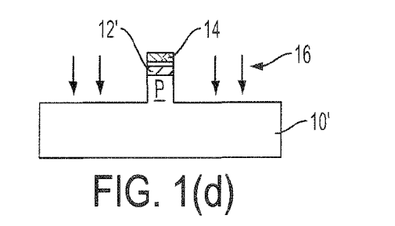
Figure 1E:
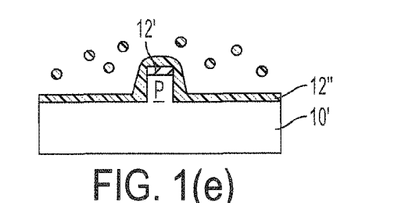
Figure 1F:
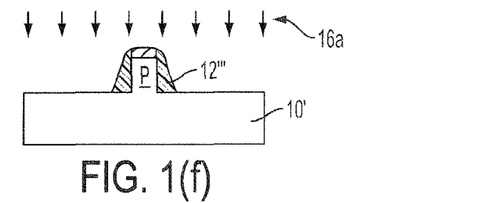

FIG. 1(b) shows a first mask layer 12 located and formed upon the substrate 10. The first mask layer 12 preferably comprises a first mask material that preferably comprises a hard mask material with respect to etching the substrate 10, as is further discussed below. More particularly, the first mask layer 12 comprises a hard mask material such as but not limited to a silicon nitride hard mask material when the substrate 10 comprises a monocrystalline silicon semiconductor substrate. Typically, the first mask layer 12 is located and formed upon the substrate 10 to a thickness from about 250 to about 350 nanometers while using a vapor deposition method such as but not limited to a physical vapor deposition method or a chemical vapor deposition method (i.e., such as but not limited to a plasma enhanced chemical vapor deposition (PECVD) method or a low pressure chemical vapor deposition (LPCVD) method). The deposition conditions for forming the first mask layer 12 located and formed upon or over the substrate 10 are otherwise generally conventional.

FIG. 1(*c*) shows a resist layer 14 located and formed upon the first mask layer 12. The resist layer 14 may comprise any of several resist materials, including but not limited to positive resist materials, negative resist materials and hybrid resist materials, that may be located and formed upon the first mask layer 12. Typically and preferably, the resist layer 14 has a linewidth as shown, from about 400 to about 500 nanometers to maintain a single mode operation and a tight bending radius when operating an optical waveguide structure that results from further processing of the optical waveguide structure whose schematic cross-sectional diagram is illustrated in FIG. 1(*c*). More generally, the resist layer 14 may have a linewidth from about 200 to about 1500 nanometers to provide an operational waveguide structure including a waveguide layer having a correlating linewidth from about 200 to about 1500 nanometers and thickness from about 100 to about 500 nanometers in accordance with the embodiments. Additionally, the resist layer 14 has a thickness from about 300 to about 500 nanometers. The resist layer 14 will also have a considerably longer length, typically in a range from micrometers to centimeters, when used as a patterning layer for an optical waveguide layer within an optical waveguide structure in accordance with the embodiments.

FIG. 1(*d*) shows the results of sequentially etching: (1) the first mask layer 12 to form a first mask layer 12'; and (2) the substrate 10 to form a first etched substrate 10', while using an etchant 16 in conjunction with the resist layer 14 (and also the first mask layer 12') as an etch mask layer. The etchant 16 will typically sequentially comprise: (1) a fluorine containing etchant gas composition for etching the first mask layer 12 to provide the first mask layer 12' when comprised of a silicon nitride material; and (2) a chlorine containing etchant gas composition for etching the substrate 10 to provide the first etched substrate 10' when comprised of a monocrystalline silicon semiconductor material. As is illustrated within the schematic cross-sectional diagram of FIG. 1(*d*), a pillar P that is located and formed within the first etched substrate 10' beneath the first mask layer 12' has a height from the lower plateau of the first etched substrate 10' to the interface of the first etched substrate 10' with the first mask layer 12' from about 500 to about 700 nanometers.

FIG. 1(*e*) first shows the results of stripping the resist layer 14 from the first mask layer 12' within the optical waveguide structure whose schematic cross-sectional diagram is illustrated in FIG. 1(*d*). The resist layer 14 may be stripped from the first mask layer 12' while using methods and materials that are otherwise generally conventional in the microelectronics fabrication art, and in particular the optoelectronics fabrication art. Such methods and materials may include, but are not necessarily limited to, wet chemical etch methods and materials, dry plasma etch methods and materials and combinations of wet chemical etch methods and materials and dry plasma etch methods and materials.

FIG. 1(*e*) also shows the results of depositing a second mask layer 12" upon the optical waveguide structure of FIG. 1(*d*) after having stripped from the optical waveguide structure of FIG. 1(*d*) the resist layer 14. As is illustrated within the schematic cross-sectional diagram of FIG. 1(*e*), the second mask layer 12" is located and formed upon the optical waveguide structure that is illustrated in the schematic cross-sectional diagram of FIG. 1(*d*) absent the resist layer 14, but with the presence of the first mask layer 12'. Typically and preferably, the second mask layer 12" also comprises a silicon nitride material, but which has a thickness from about 300 to about 400 nanometers.

FIG. 1(*f*) shows the results of etching the optical waveguide structure whose schematic cross-sectional diagram is illustrated in FIG. 1(*e*) to provide a second mask layer 12''' that includes portions of the second mask layer 12" and the first mask layer 12'. As is illustrated within the schematic cross-sectional diagram of FIG. 1(*f*), the second mask layer 12''' covers the top surface and the sidewall surfaces of the pillar P within the first etched substrate 10', but not the adjacent lower lying horizontal plateau surfaces of the first etched substrate 10' that adjoin the pillar P. The etching that is illustrated within the schematic cross-sectional diagram of FIG. 1(*f*) is effected using an etchant 16*a* that may comprise a fluorine containing etchant gas composition otherwise analogous to the fluorine containing etchant gas composition used within a first portion of the etchant 16 that is illustrated in FIG. 1(*d*), when the second mask layer 12''' comprises a silicon nitride material.

FIG. 1(*g*) shows the results of an optional further etching of the first etched substrate 10' that is illustrated in FIG. 1(*f*) to provide a second etched substrate 10" that includes an extended pillar P' that is derived from the pillar P that is illustrated in FIG. 1(*f*). This additional etching may be effected using an etchant 16*b* that may comprise a chlorine containing etchant gas composition corresponding with the chlorine containing etchant gas composition used within a later portion of the etchant 16 that is illustrated within FIG. 1(*d*). This additional etching also leaves exposed a vertical section of the pillar P' sidewall from about 500 to about 700 nanometers, thus nominally providing that the pillar P' as illustrated in FIG. 1(*g*) has a height approximately twice the height of the pillar P as illustrated in FIG. 1(*f*).

FIG. 1(*h*) shows the results of thermally oxidizing the waveguide structure of FIG. 1(*g*) at a temperature from about 1000 to about 1200 degrees centigrade for a time period from about 4 to about 8 hours that provides for sidewall oxidation of a lower portion of the pillar P' and an adjoining planar surface oxidation of the lower horizontal plateau surface of the twice etched substrate 10" to provide a contiguous waveguide isolation layer 18 located and formed interposed between an optical waveguide layer 10*a* and a thinned substrate 10*b*. As is illustrated within the schematic cross-sectional diagram of FIG. 1(*h*), the optical waveguide layer 10*a* has a valley nominally centered in a bottom (i.e., lower) surface of the optical waveguide layer 10*a* (i.e., at an interface with a top (i.e., upper) surface of the waveguide isolation layer 18) and the thinned substrate 10*b* has a peak in a top (i.e., upper) surface of the thinned substrate 10*b* (i.e., at an interface with a bottom (i.e., lower) surface of the waveguide isolation layer 18) that corresponds with the valley in the bottom surface of the optical waveguide layer 10*a*.

At this point in the processing of the optical waveguide structure in accordance with the embodiments, the optical waveguide structure as illustrated within the schematic cross-sectional diagram of FIG. 1(*h*) may be further fabricated by locating and forming a passivation layer upon the optical waveguide structure (i.e., with or without removal of the second mask layer 12''') to provide a complete and operational optical waveguide structure. The methodology at this point in accordance with the embodiments provides value, particularly within the context of etching the pillar P within the schematic cross-sectional diagram of FIG. 1(f) to provide the extended pillar P' within the schematic cross-sectional diagram of FIG. 1(g) insofar as the additional exposed sidewall surface of the extended pillar P' provides for ready pinch-off of the extended pillar P' when forming the optical waveguide layer 10a and the thinned substrate 10b as illustrated within the schematic cross-sectional diagram of FIG. 1(h). As well, the valley in the bottom surface of the optical waveguide layer 10a in conjunction with the related peak within the top surface of the thinned substrate 10b are both definitive structural features of an operational optical waveguide structure fabricated in accordance with the embodiments that is formed with limited thermal oxidation treatment.

Figure 1G:
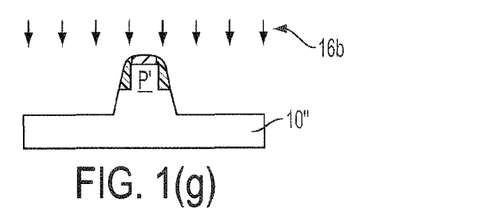
Figure 1H:
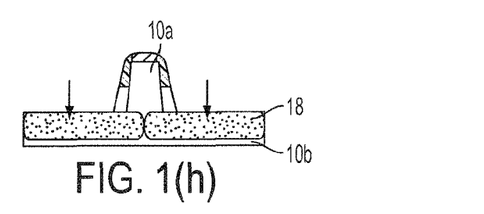
Figure 1I:
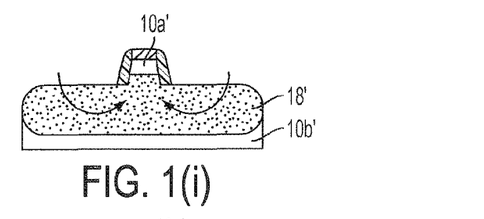

Nonetheless, FIG. 1(i) shows the results of further thermal oxidation processing of the optical waveguide structure that is illustrated in FIG. 1(h), typically for a time period from about 12 to about 16 hours, to provide for further thickening of the optical waveguide isolation layer 18 and provide an optical waveguide isolation layer 18'. This further thickening of the optical waveguide isolation layer 18 to provide the optical waveguide isolation layer 18' is accompanied by a thinning of the optical waveguide layer 10a to provide an optical waveguide layer 10a' and the thinned substrate 10b to provide a thinned substrate 10b'. As is illustrated within the schematic cross-sectional diagram of FIG. 1(i), neither the optical waveguide layer 10a' nor the thinned substrate 10b' has a valley nor a peak and thus the optical waveguide layer 10a' has a planar bottom surface and the thinned substrate 10b' has a planar top surface.

Figure 1J:
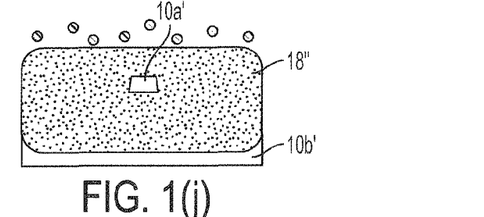

FIG. 1(j) shows the results of further backfilling of the optical waveguide structure of FIG. 1(i) (i.e., with or without removal of the second mask layer 12'") with an additional deposited dielectric layer that typically but not necessarily exclusively comprises a silicon oxide dielectric material to form a planarized waveguide structure that includes an optical waveguide isolation layer 18". The additional deposited dielectric layer may be formed using methods and materials that are otherwise generally conventional in the microelectronics fabrication art, including in particular the optoelectronics fabrication art. Such methods may include, but are not necessarily limited to physical vapor deposition methods and chemical vapor deposition methods, such as but not limited to plasma enhanced chemical vapor deposition methods and low pressure chemical vapor deposition methods. Typically and preferably, the additional deposited dielectric layer comprises a silicon oxide dielectric material, although the embodiments are not necessarily so limited.

Thus, the illustrated embodiment in particular with respect to FIG. 1(h) shows an optical waveguide structure including an optical waveguide layer 10a that includes a valley in a bottom surface of the optical waveguide layer 10a that corresponds with a peak in a top surface of a thinned substrate 10b that also comprises the optical waveguide structure. Such an optical waveguide structure in accordance with FIG. 1(h) is desirable within the context of the embodiments insofar as such an optical waveguide structure provides an operational optical waveguide structure (i.e., presuming a separation of the valley within the bottom surface of the optical waveguide layer 10a from the peak in the top surface of the thinned substrate 10b is at least about 1 micron) with an economy of fabrication resources.

Figure 2A:
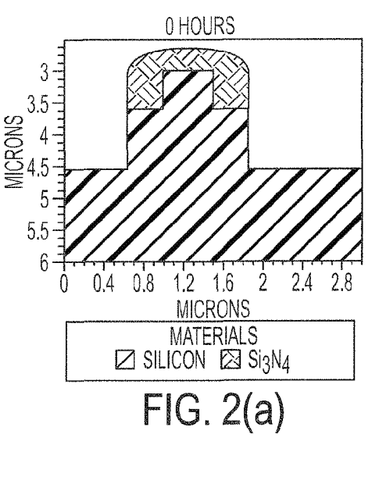
FIG. 2(a) to FIG. 2(d) show a series of schematic cross-sectional diagrams illustrating the results of progressive process steps as simulated for fabricating an optical waveguide structure in accordance with the embodiments.
Figure 2B:
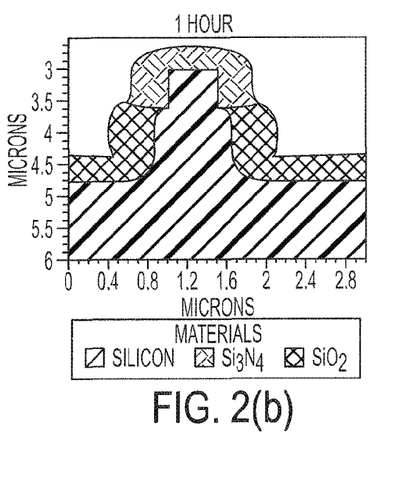
Figure 2C:
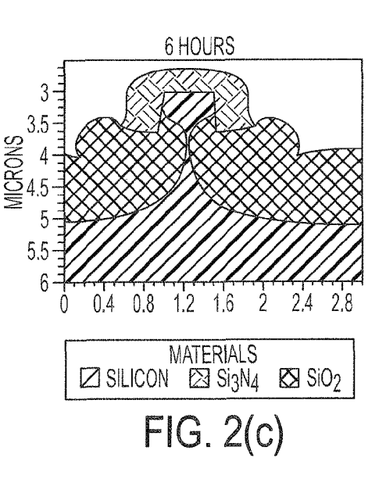
Figure 2D:
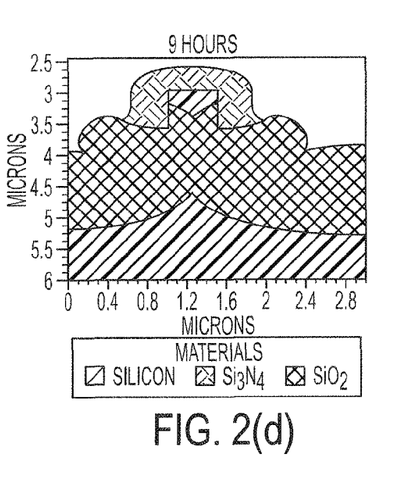

FIG. 2(a) to FIG. 2(d) show a series of schematic cross-sectional diagrams illustrating a simulation of progressive stages in thermally oxidizing the optical waveguide structure of FIG. 1(g) to provide the optical waveguide structure of FIG. 1(h). FIG. 2(a) shows the optical waveguide structure as is illustrated in FIG. 1(g). FIG. 2(b), FIG. 2(c) and FIG. 2(d) show the results of thermal oxidation after time intervals of 1, 5 and 9 hours. The series of schematic cross-sectional diagrams of FIG. 2(a) to FIG. 2(d) was obtained using a Silvaco Athena modeling software application program. In general, the Silvaco Athena modeling software application program underestimated an oxidation time when forming an optical waveguide structure in accordance with the embodiments.

As is illustrated in particular within FIG. 2(c) and FIG. 2(d), the waveguide layer includes a bottom surface that has a valley centered nominally there under and the thinned substrate has a top surface that has a peak that corresponds with the valley.

Figure 3:
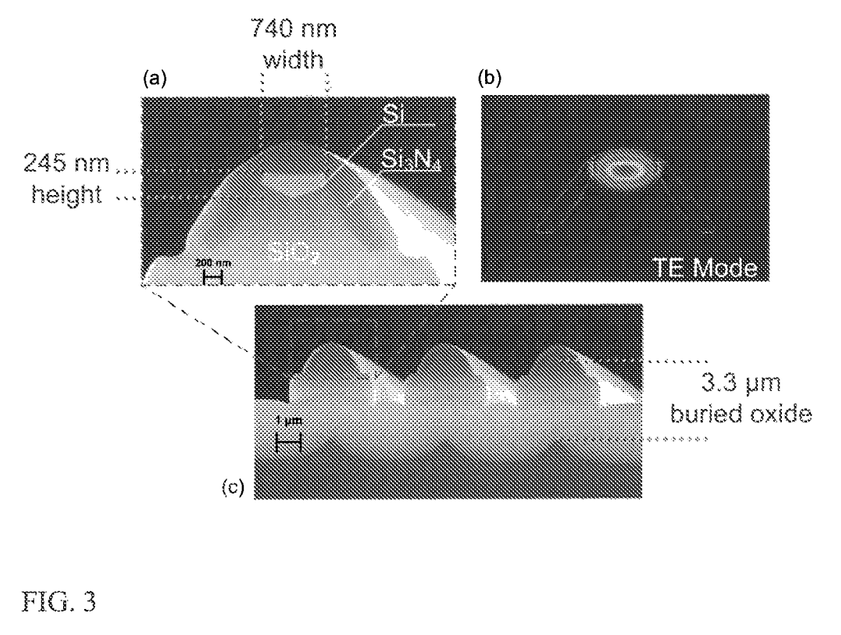
FIG. 3(a) to FIG. 3(c) show a pair of scanning electron microscopy images of an optical waveguide structure fabricated in accordance with the embodiments, along with an image of TE mode transmission characteristics of the optical waveguide structure fabricated in accordance with the embodiments.

FIG. 3(a) and FIG. 3(c) shows scanning electron microscopy images of an optical waveguide structure fabricated in accordance with the foregoing embodiments within the context of a thermal oxidation treatment at a temperature of about 1100 degrees centigrade for a thermal oxidation time period of about 6 hours. The structural features and the materials of composition of the optical waveguide structure are designated in FIG. 3(a) and FIG. 3(c) and correlate with the structural features and materials of composition of the optical waveguide structure in accordance with the embodiments as described above within the context of FIG. 1(a) to FIG. 1(h). FIG. 3(b) shows TE mode transmission characteristics of the optical waveguide structure whose scanning electron microscopy images are illustrated in FIG. 3(a) and FIG. 3(c) with an effective index of 2.63. TM mode transmission characteristics are also illustrated within FIG. 3(b) for comparison.

Figure 4:
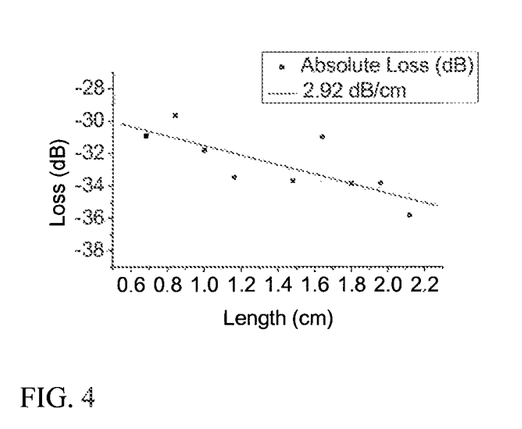
FIG. 4 shows a graph of loss versus length for an optical waveguide structure fabricated in accordance with the embodiments at various optical waveguide structure waveguide layer lengths.

FIG. 4 shows propagation loss characteristics of a plurality of optical waveguide structures that were fabricated in accordance with the embodiments. In general, the propagation loss characteristics were determined and calculated using a cut-back method which provided for fabrication of the plurality of waveguide structures in accordance with the embodiments of differing optical waveguide layer lengths upon a substrate and measurement of absolute and relative optical losses between the optical waveguide layers of different length.

Fiber coupling was used to guide light into an optical waveguide structure at a polished edge of a chip. Transmitted light was collected from the optical waveguide structure at an output edge of the chip with a collimating objective and an optical power detector. Observed were similar losses for TE mode transmission and TM mode transmission for unpolarized light travelling through the optical waveguide structures. Measured losses were 2.92 dB/cm, as shown in FIG. 4, although several factors may influence measured losses.

It is anticipated that the measured optical losses in accordance with the above description may be reduced under certain circumstances, and that the data presented in FIG. 4 should be limited to monocrystalline silicon waveguide layer losses and monocrystalline silicon waveguide structure losses. A gap between the optical waveguide and the substrate, although tapered, is still less than 1 μm and may under certain circumstances possibly leak some optical power to the substrate. An interfacial or surface roughness in a valley portion of an optical waveguide layer might also contribute to optical losses as well. Also contributing might be a lower quality plasma enhanced chemical vapor deposition deposited silicon nitride as used in the mask layers when fabricating an optical waveguide structure in accordance with the embodiments. In that regard, improvements may possibly be observed using a low pressure chemical vapor deposition method for deposited silicon nitride materials.

The optical waveguide structure fabrication methodology described within the context of the embodiments may be used to fabricate a small (i.e., less than about 1 micron linewidth)

optical waveguide layer with channel geometry, on a common bulk silicon semiconductor wafer with optical losses at least as low as about 2.9 dB/cm, comparable to similar optical waveguide layers and optical waveguide structures fabricated using semiconductor-on-insulator substrates. In accordance with the embodiments, the optical waveguide layers are made of monocrystalline silicon (i.e., single crystal silicon), important for maintaining high contrast in small footprint optical devices and optoelectronic devices with low losses. In accordance with the embodiments, an optical waveguide layer within an optical waveguide structure may be fabricated directly using a conventional complementary metal oxide semiconductor (CMOS) compatible bulk silicon semiconductor wafer with generally conventional complementary metal oxide semiconductor compatible processes, such that an optical waveguide layer or an optical waveguide structure in accordance with the embodiments may be integrated in parallel with a transistor layer or a transistor structure within a concurrently fabricated semiconductor chip.

Finally the methodology in accordance with the embodiments requires only one lithography process step, thereby reducing the variability in the fabrication of both a photonic material stack that comprises an optical waveguide layer or an optical waveguide structure, as well as any electronic, optoelectronic or optical devices that may be simultaneously fabricated.

All references, including publications, patent applications, and patents cited herein are hereby incorporated by reference in their entireties to the extent allowed, as if each reference was individually and specifically indicated to be incorporated by reference and was set forth in its entirety herein.

The use of the terms "a" and "an" and "the" and similar referents in the context of describing the embodiments (especially in the context of the following claims) is to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

The term "connected" is to be construed as partly or wholly contained within, attached to, or joined together, even if there is something intervening.

The recitation of ranges of values herein is merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context.

The use of any and all examples, or exemplary language (e.g., "such as") provided herein, is intended merely to better illuminate embodiments and does not impose a limitation on the scope of the embodiments or the invention, unless otherwise claimed.

No language in the specification should be construed as indicating any non-claimed element as essential to the practice of the invention.

It will be apparent to those skilled in the art that various modifications and variations can be made to the present embodiments without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A waveguide structure, comprising:
    a waveguide layer located over a substrate, the waveguide layer comprising a waveguide material and including a non-planar bottom surface of the waveguide layer, wherein the substrate comprises a peak within a top surface of the substrate aligned with a valley within the bottom surface of the waveguide layer that is located over the substrate, further wherein the valley within the bottom surface of the waveguide layer is separated from the peak within the top surface of the substrate by a separation distance at least about 1000 nanometers.

2. The waveguide structure of claim 1 further comprising a waveguide isolation layer comprising a waveguide isolation material located interposed between the waveguide layer and the substrate.

3. The waveguide structure of claim 1 wherein the waveguide material and the substrate comprise the same monocrystalline material.

4. The waveguide structure of claim 1 wherein the waveguide material and the substrate comprise the same monocrystalline semiconductor material.

5. The waveguide structure of claim 1 wherein the waveguide material and the substrate comprise the same monocrystalline silicon semiconductor material.

6. The waveguide structure of claim 1 wherein:
    the waveguide layer has a linewidth from about 200 to about 1500 nanometers;
    the waveguide layer has a thickness from about 100 to about 500 nanometers.

7. An optical waveguide structure comprising:
    a substrate;
    an optical waveguide isolation layer located over the substrate; and
    an optical waveguide layer comprising an optical waveguide material located over the optical waveguide isolation layer, the optical waveguide layer having a valley within a bottom surface of the optical waveguide layer that corresponds with a peak within a top surface of the substrate.

8. The optical waveguide structure of claim 7 wherein the substrate and the optical waveguide layer comprise the same monocrystalline silicon waveguide material.

9. A method for fabricating a waveguide structure comprising:
    forming a first mask layer upon a substrate that comprises a thermally oxidizable waveguide material to provide a first masked substrate;
    etching the first masked substrate to provide a pillar beneath the first mask layer within an etched first masked substrate;
    forming a second mask layer upon the sidewalls and top of the pillar within the etched first masked substrate to provide a second masked substrate; and
    thermally oxidizing the second masked substrate to provide a waveguide layer from a top portion of the pillar beneath the second mask layer separated from a thinned substrate derived from the second masked substrate by a waveguide isolation layer derived from thermal oxidation of the thermally oxidizable waveguide material interposed between the waveguide layer and the thinned substrate.

10. The method of claim wherein the substrate comprises a bulk substrate.

11. The method of claim 9 wherein the thermally oxidizable waveguide material comprises a thermally oxidizable monocrystalline waveguide material.

12. The method of claim 9 wherein the thermally oxidizable waveguide material comprises a thermally oxidizable monocrystalline silicon waveguide material.

13. The method of claim 9 wherein the forming the second mask layer uses a self-aligned method.

14. The method of claim 9 wherein the thermally oxidizing provides a valley in a bottom surface of the waveguide layer that corresponds with a peak in a top surface of the thinned substrate.

15. A method for fabricating an optical waveguide structure comprising:
    forming a first mask layer over a bulk monocrystalline silicon substrate to provide a first masked bulk monocrystalline silicon substrate;
    etching the first masked bulk monocrystalline silicon substrate to provide a pillar beneath the first mask layer within an etched first masked bulk monocrystalline silicon substrate;
    forming a second mask layer upon the sidewalls and top of the pillar within the etched first masked bulk monocrystalline silicon substrate to provide a second masked bulk monocrystalline silicon substrate; and
    thermally oxidizing the second masked bulk monocrystalline silicon substrate to provide a monocrystalline silicon waveguide layer from a top portion of the pillar beneath the second mask layer separated from a thinned substrate derived from the second masked bulk monocrystalline silicon substrate by a waveguide isolation layer derived from thermal oxidation of the monocrystalline silicon waveguide material interposed between the monocrystalline silicon waveguide layer and the thinned substrate.

16. The method of claim 15 further comprising etching the pillar to provide an extended pillar prior to thermally oxidizing the second masked monocrystalline silicon substrate to provide the monocrystalline silicon waveguide layer and the thinned substrate.

17. The method of claim 15 wherein the forming the second mask layer uses a self aligned method.

18. The method of claim 15 wherein the forming the first mask layer and the forming the second mask layer use the same mask material.

19. A waveguide structure, comprising:
    a waveguide layer located over a substrate, the waveguide layer comprising a waveguide material and including a non-planar bottom surface of the waveguide layer, wherein the substrate comprises a peak within a top surface of the substrate aligned with a valley within the bottom surface of the waveguide layer that is located over the substrate; and
    a waveguide isolation layer comprising a waveguide isolation material located interposed between the waveguide layer and the substrate.

20. The waveguide structure of claim 19 wherein the waveguide material and the substrate comprise the same monocrystalline material.

21. The waveguide structure of claim 19, wherein the waveguide material and the substrate comprise the same monocrystalline semiconductor material.

22. The waveguide structure of claim 19, wherein the waveguide material and the substrate comprise the same monocrystalline silicon semiconductor material.

23. The waveguide structure of claim 19, wherein:
    the waveguide layer has a linewidth from about 200 to about 1500 nanometers;
    the waveguide layer has a thickness from about 100 to about 500 nanometers.

* * * * *

UNITED STATES PATENT AND TRADEMARK OFFICE
CERTIFICATE OF CORRECTION

PATENT NO. : 8,655,138 B2  Page 1 of 1
APPLICATION NO. : 13/104440
DATED : February 18, 2014
INVENTOR(S) : Michal Lipson et al.

It is certified that error appears in the above-identified patent and that said Letters Patent is hereby corrected as shown below:

In the Claims

Please amend claim 10 as follows:

Column 10, line 66, please change "claim wherein" to --claim 9 wherein--.

Signed and Sealed this
Tenth Day of February, 2015

Michelle K. Lee
*Deputy Director of the United States Patent and Trademark Office*